United States Patent [19]

Schündehütte et al.

[11] Patent Number: 5,070,193

[45] Date of Patent: Dec. 3, 1991

[54] REACTIVE PHTHALOCYANINE DYESTUFFS

[75] Inventors: Karl H. Schündehütte; Manfred Groll, both of Leverkusen; Josef W. Stawitz, Odenthal-Gloebusch, all of Fed. Rep. of Germany

[73] Assignee: Bayer Aakatiengesellschaft, Leverkusen, Fed. Rep. of Germany

[21] Appl. No.: 450,632

[22] Filed: Dec. 14, 1989

[30] Foreign Application Priority Data

Dec. 23, 1988 [DE] Fed. Rep. of Germany ....... 3843558

[51] Int. Cl.$^5$ ...................... C09B 62/26; D06P 1/382; C07D 209/56
[52] U.S. Cl. ......................................... 540/125; 8/661
[58] Field of Search ............................. 540/125; 8/661

[56] References Cited

U.S. PATENT DOCUMENTS 4,246,174  1/1981  Groll .................................. 540/125

FOREIGN PATENT DOCUMENTS 1165661  3/1967  France ................................. 540/125

Primary Examiner—Mukund J. Shah
Assistant Examiner—E. C. Ward
Attorney, Agent, or Firm—Sprung Horn Kramer & Woods

[57] ABSTRACT

Novel reactive dyestuffs of the formula

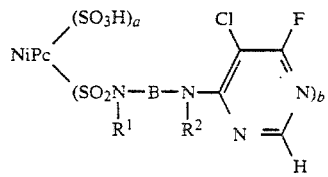

having the substituent meanings specified in the description are highly suitable for dyeing and printing hydroxyl- and amido-containing textile materials. They produce very fast dyeings and prints in high yields.

4 Claims, No Drawings

REACTIVE PHTHALOCYANINE DYESTUFFS

The present invention relates to reactive dyes of the formula

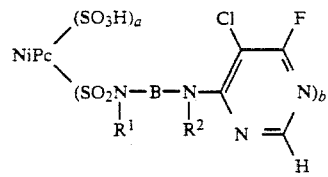

where
NiPc is the radical of a nickel phthalocyanine,
$R^1$ and $R^2$ are independently of one another H or optionally substituted $C_1-C_4$-alkyl,
is optionally substituted phenylene, $C_2-C_8$-alkylene or phenyl-$C_1-C_4$-alkylene,
a is 1.5 to 3.2, preferably 2.5 to 3.1,
b is 1.5 to 0.8, preferably 1.2 to 0.9,
a+b being 3 to 4.

Each of the sulpho or sulphonamido groups is bonded to a different benzene ring of the phthalocyanine in the 3- or 4-position.

Suitable radicals $R^3$ and $R^2$ besides H are for example also OH—, COOH—, OSO$_3$H—or SO$_3$H—substituted $C_1-C_4$-alkyl radicals such as methyl, ethyl, propyl, $\beta$-hydroxyethyl, $\gamma$-hydroxypropyl, $\beta$-carboxyethyl and $\beta$-sulphoethyl.

Suitable radicals B are in particular phenylene, optionally substituted by $C_1-C_4$-alkyl, $C_1-C_4$-alkoxy, halogen, in particular Cl, nitro, cyano, COOH, SO$_3$H, carboxamide, sulphonamide, acylamino, in particular $C_1-C_4$-alkylcarbonylamino or —NHCONH$_2$, -CH$_2$CH$_2$-, —CH$_2$CH$_2$CH$_2$-, -CH$_2$-C$_6$H$_5$—.

Examples of B are: 1,2-phenylene, 1,3-phenylene, 1,4-phenylene, 3-methyl-1,2-phenylene, 2-methyl-1,4-phenylene, 2-methyl-5-chloro-1,4-phenylene, 4-methoxy-1,3-phenylene, 3-methoxy-1,4-phenylene, 4-chloro-1,3-phenylene, 2-chloro-1,4-phenylene, 5-carboxamido-1,3-phenylene, 1,4-phenylene-2-sulphonic acid, 1,3-phenylene-4-sulphonic acid, 1,3-phenylene 5-carboxylic acid, 1,3-phenylene-4-carboxylic acid.

Preferred dyestuffs (I) are those where
$R^1$, $R^2$=H,
B=phenylene, optionally substituted by $C_1-C_4$-alkyl, $C_1-C_4$-alkoxy, halogen,
a=2.5 to 3.1,
b=0.9 to 1.2.
Preferred dyestuffs (I) also include those where
$R^1$, $R^2$=H,
B=sulpho- or carboxy-phenylene, optionally further substituted by $C_1-C_4$-alkyl, $C_1-C_4$-alkoxy, halogen (Cl),
a=2.5 to 3.1,
b=0.9 to 1.2.
Particularly preferred dyestuffs (I) are those where
$R^1$, $R^2$=H,
B=phenylene,
a=2.5 to 3.1,
b=0.9 to 1.2.

The indicated formulae are those of free acids. In general, the salts obtained in the course of the customary preparation, in particular the alkali metal or ammonium salts, are used.

Dyestuffs (I) are prepared for example by reacting a nickel phthalocyaninesulphonyl chloride of the formula

where
NiPc=radical of an Ni-phthalocyanine,
q=0.2 to 2.0 and
p=2.0 to 3.8,
with 0.8 to 1.2 moles of an amine of the formula

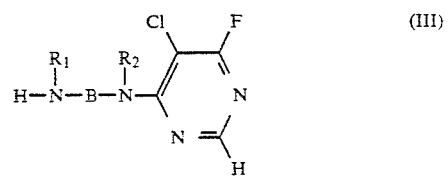

where B, $R^1$ and $R^2$ are as defined for the formula (I) and subsequently hydrolysing any chlorosulphonyl groups still present.

Amines of the formula (III) are easily preparable by reacting the corresponding diamine at one end with 4,6-difluoro-5-chloropyrimidine of the formula

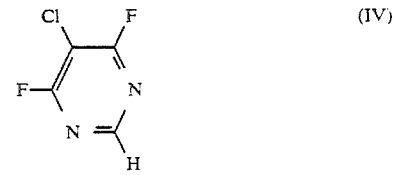

at 20 to 35° C. in aqueous suspension.

Another way of preparing the abovementioned dyestuffs consists in first reacting the phthalocyaninesulphonyl chloride of the formula (II) with 0.8 to 1.2 moles of an amine of the formula

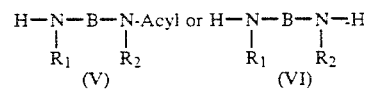

where B, $R^1$ and $R^2$ are as defined for the formula (I), hydrolysing the acylamino group if necessary, and reacting the basic dyestuff obtained with 0.8 to 1.2 moles of 4,6-difluoro-5-chloropyrimidine of the formula

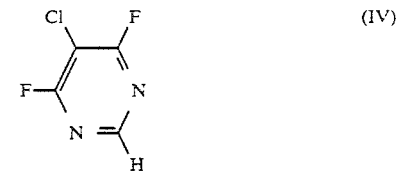

The Ni-phthalocyaninesulphonyl chlorides of the formula (II) are prepared by treating Ni-phthalocyanine in chlorosulphonic acid at about 130 to 140° C.

Amines of the formula (III) are for example:
4-(3-Aminophenyl)amino-5-chloro-6-fluoropyrimidine,
4-(4-Aminophenyl)amino-5-chloro-6-fluoropyrimidine, 4-(2-Aminophenyl)amino-5-chloro-6-fluoropyrimidine,
4-(4-Methylaminophenyl)amino-5-chloro-6-fluoropyrimidine,
4-(3-Amino-4-methylphenyl)amino-5-chloro-6-fluoropyrimidine,
4-(4-Amino-3-chlorophenyl)amino-5-chloro-6-fluoropyrimidine,
4-(3-Aminophenyl-4-sulpho)amino-5-chloro-6-fluoropyrimidine,
4-(3-Amino-4-carboxyphenyl)amino-5-chloro-6-fluoropyrimidine,
4-(4-Aminophenyl)methylamino-5-chloro-6-fluoropyr
4-(2-Aminoethyl)amino-5-chloro-6-fluoropyrimidine,
4-(2-Methylaminoethyl)methylamino-5-chloro-6-fluoropyrimidine, Examples of amines of the formula (V) are: 4-aminoformanilide, 3-aminoformanilide, 2-aminoacetanilide, 3-aminoacetanilide, 4-aminoacetanilide, 3-aminophenyloxamidic acid, 4-aminophenyloxamidic acid, N-(3-aminophenyl)-2-hydroxyacetamide, N-(4-aminophenyl)-N-methylacetamide, N-(4-aminophenyl)-N-methylformamide, N-(4-aminophenyl)-N-ethylacetamide, N-(4-amino-2,5dichlorophenyl)acetamide, N-(4-amino-3-nitrophenyl)acetamide, N-(5-amino-2-methylphenyl)formamide, N-(5-amino-2methylphenyl)acetamide, N-(3-amino-2-methylphenyl)acetamide, N-(3-amino-4-methylphenyl)-N-ethylacetamide, N-(4-amino-3-amino-4-methylphenyl)-N-ethylacetamide, N-(2-amino-4-methylphenyl)acetamide, N-(acetylamino)-2-aminobenzoic acid, 5-(acetylamino)-2-aminobenzoic acid, acetylethylenediamine.

Examples of amines of the formula (VI) are: 1,3-diaminobenzene, 1,4-diaminobenzene, 1,3-diaminobenzene-4-sulphonic acid, 1,4-diaminobenzene-2-sulphonic acid, 1,3-diaminobenzene-4-carboxylic acid, 1,4-diaminobenzene-2-carboxylic acid, 2-chloro-1,4-phenylenediam 2-nitro-1,4-phenylenediamine, N-methylethylenediamine.

The reaction of the phthalocyaninesulphonyl chlorides of the formula (II) with the amines of the formulae (III), (V) and (VI) is preferably carried out in aqueous solution or suspension at temperatures of 0 to 30° C and pH values of 6 to 11. The hydrolysis of the acylamino group after reaction of (II) with (V) can be carried out not only in an acidic medium but also in an alkaline medium, preferably at temperatures of 70 to 80°.

The reaction of the basic dyestuff with the difluorochloropyrimidine of the formula (IV) is carried out in aqueous solution at pH 6 to 7 and at 20° to 35° C.

If a phthalocyaninesulphonyl chloride of the formula (II) is reacted with an amine of the formula (III), it is not necessary to start from the isolated amine (III). On the contrary, the suspension of (III) obtained on reacting diamine at one end with 4,6-di-fluoro-5-chloropyrimidine can be used for the reaction with the phthalocyaninesulphonyl chloride.

The novel dyestuffs are highly suitable for dyeing and printing hydroxyl- and amido-containing textile materials, for example those made of cellulose, wool or synthetic polyamides. They are applied in a conventional manner.

In the Examples which follow, parts are by weight and degrees are degrees Celsius.

EXAMPLE 1

57.5 parts of 99% pure nickel phthalocyanine are stirred into 257 parts of chlorosulphonic acid at 136 to 138° C. for 8 hours. The melt is cooled down to 25° C. and with or without prior dilution with a little chlorosulphonic acid is discharged onto ice, for which a temperature of +3° should not be exceeded. The suspension is filtered with suction and the filter residue is washed with 1,600 parts of ice-water to which 150 parts of 30% strength hydrochloric acid has been added.

The filter residue is made up in 1,000 parts of ice-water and stirred for 15 minutes. 26.5 parts of 4-fluoro-5-chloro-6-(3-aminophenyl)aminopyrimidine are added with stirring. The pH of the suspension is brought to 9.0 by the addition of sodium hydroxyl solution over 90 minutes, during which the temperature is raised at the same time to 23°. The mixture is stirred at pH 9 and 20 to 24° until the reaction has ended. The dyestuff is salted out, briefly stirred at pH 7, filtered off with suction and repeatedly covered with dilute NaCl solution. The dyestuff is dried at 60°. It conforms in the form of its free acid to the formula

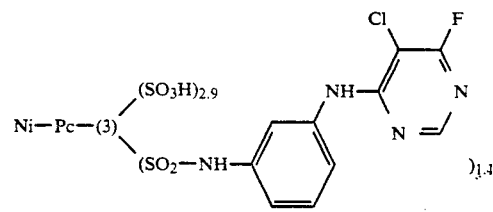

The dyestuff dyes cotton in extremely wash- and light-fast blueish green shades, the optimum dyeing temperature being 80°.

Dyestuffs having similar properties are obtained on replacing the 26.5 parts of 4-fluoro-5-chloro-6-(3-aminophenyl)aminopyrimidine mentioned in paragraph 2 by an equivalent amount of 4-fluoro-5-chloro-6-(4-aminophenyl)aminopyrimidine or an equivalent amount of 4-fluoro-5-chloro-6-(4-aminophenyl)methylaminopyrimidine.

EXAMPLE 2

57.5 parts of 99% pure nickel phthalocyanine are stirred into 257 parts of chlorosulphonic acid at 136 to 138° for 8 hours. The melt is cooled down to 25° and —with or without prior dilution with a little chlorosulphonic acid—is discharged onto ice, for which a temperature of +3° should not be exceeded. The suspension is filtered with suction and the filter residue is washed with 1,600 parts of ice-water to which 150 parts of 30% strength hydrochloric acid has been added.

The filter residue is made up in 500 ml of icewater and stirred at 0 to 3° for 15 minutes. 32 parts of 3-aminoacetanilide.hydrochloride (51.6% strength) are then added with stirring. The pH of the suspension is brought to pH 10 in the course of 90 minutes and at the same time the temperature is raised to 24°. The mixture is stirred at pH 10 until the reaction has ended, and the temperature is raised to 70° while the pH is allowed to drop to 9.0. To hydrolyse the acetylamino group, 276 parts of 30.7% strength sodium hydroxide solution are added with stirring, and the hydrolysing reaction is carried out at 72° for 6 hours. The basic dyestuff is precipitated by the addition of hydrochloric acid, filtered off with suction and briefly washed with dilute hydrochloric acid.

The paste of basic dyestuff is thoroughly pressed dry and then dissolved in 1,500 ml of water at pH 7. 17.5 parts of 4,6-difluoro-5-chloropyrimidine (in the molten state) are then added dropwise at 26 to 30° in the course of 10 minutes while a pH of 6.5 to 7.0 is maintained. The mixture is stirred at pH 6.5 to 7.0 until the reaction has ended at 30 to 40°. The mixture is then cooled down to 20 to 25°, and the dyestuff is precipitated by the gradual addition of 500 parts of NaCl solution. The dyestuff is filtered off with suction, briefly washed with dilute NaCl solution and dried at 50 to 60°. The dyestuff, obtained in an almost quantitative yield, conforms in the form of its free acid to the formula

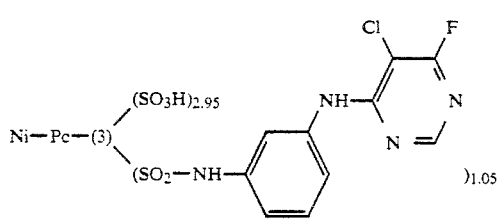

It dyes cotton in very wash- and light-fast bluish green shades, the optimum dyeing temperature being 80°.

EXAMPLE 3

57.5 parts of 99% pure nickel phthalocyanine are stirred into 180 parts of chlorosulphonic acid at 136 to 138° for 8 hours. The melt is cooled down to 25° and —with or without prior dilution with a little chlorosulphonic acid —is discharged onto ice, for which a temperature of +3° should not be exceeded. The suspension is filtered with suction and the filter residue is washed with 1,600 parts of ice-water to which 150 parts of 30% strength hydrochloric acid has been added.

The filter residue is made up in 1,000 parts of ice-water and stirred for 15 minutes. 21.5 parts of 4-fluoro-5-chloro-6-(3-aminophenyl) aminopyrimidine are added with stirring. The pH of the suspension is brought to 10 by the addition of sodium hydroxyl solution over 90 minutes. The mixture is stirred for 2 hours at 0–5° C. and pH 10, heated to 20° C and stirred at pH 10 and 20–24° until the reaction has ended. The dyestuff is salted out, briefly stirred at pH 7, filtered off with suction and covered with dilute NaCl solution. The dyestuff is dried at 60° It conforms in the form of its free acid to the formula

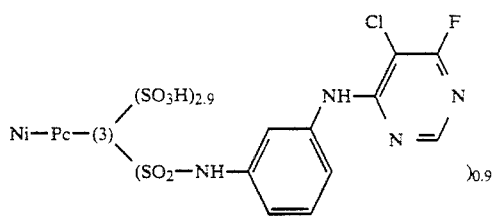

The dyestuff dyes cotton in extremely wash- and light-fast green shades, the optimum dyeing temperature being 80°.

Dyestuffs having similar properties are obtained on replacing the 21.5 parts of 4-fluoro-5-chloro-6-(3-aminophenyl)aminopyrimidine mentioned in paragraph 2 by an equivalent amount of 4-fluoro-5-chloro-6-(3-chloro-4-aminophenyl)aminopyrimidine or an equivalent amount of 4-fluoro-5-chloro-6-(3-amino-4-methylphenyl)amino pyrimidine.

We claim:

1. A reactive dyestuff of the formula

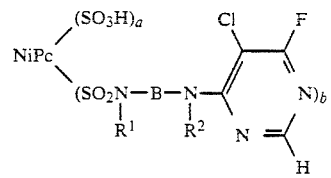

where

NiPc=radical of a nickel phthalocyanine, $R^1$, $R^2$=H, unsubstituted $C_1$-$C_4$-alkyl or $C_1$-$C_4$-alkyl substituted by OH—, COOH—, $OSO_3H$, or $SO_3H$, B=unsubstituted phenylene; phenylene substituted by $C_1$$C_4$-alkyl, $C_1$-$C_4$-alkoxy, halogen, nitro, cyano, COOH, $SO_3H$, carboxamide, sulphonamide, $C_1$-$C_4$-alkylcarbonylamino or $NHCONH_2$; $C_2$-$C_8$-alkylene or phenyl-$C_1$-$C_4$-alkylene, a=2.5 to 3.1, and b=1.2 to 0.9, a+b being less than or equal to 4.

2. A dyestuff of claim 1 where $R^1$, $R^2$=H,

B=unsubstituted phenylene or phenylene substituted by $C_1$-$C_4$-alkyl, $C_1$-$C_4$-alkoxy, halogen, a=2.5 to 3.1, b=1.2 to 0.9.

3. A dyestuff of claim 1 where $R^1$, $R^2$=H,

B=sulpho- or carboxy-phenylene, or sulpho- or carboxy phenylene substituted by $C_1$-$C_4$-alkyl, $C_1$-$C_4$-alkoxy, halogen, a=2.5 to 3.1, b=1.2 to 0.9.

4. A dyestuff of claim 1 where $R^1$, $R^2$=H,

B=phenylene, a=2.5 to 3.1, b=1.2 to 0.9.

* * * * *

UNITED STATES PATENT AND TRADEMARK OFFICE
CERTIFICATE OF CORRECTION

PATENT NO. : 5,070,193

DATED : December 3, 1991

INVENTOR(S) : Schundehutte et al.

It is certified that error appears in the above-identified patent and that said Letters Patent is hereby corrected as shown below:

Title Page  [73] Assignee: Delete " Aakatiengesellschaft " and substitute -- Aktiengesellschaft --

Col. 6, line 46  Delete " $R^1 1$ " and substitute -- $R^1$ --

Signed and Sealed this

Eighteenth Day of May, 1993

Attest:

MICHAEL K. KIRK

*Attesting Officer*     *Acting Commissioner of Patents and Trademarks*